United States Patent Office 3,324,121
Patented June 6, 1967

3,324,121
ALPHA-(SECONDARY AMINOMETHYL)ACYLPHE-
NOXY (AND PHENYLMERCAPTO) MONOCAR-
BOXYLIC ACIDS
James M. Sprague, Gwynedd Valley, Pa., assignor to Merck & Co., Inc., Rahway, N.J., a corporation of New Jersey
No Drawing. Original application Nov. 13, 1962, Ser. No. 237,288, now Patent No. 3,251,064, dated May 10, 1966. Divided and this application Feb. 28, 1966, Ser. No. 530,383
11 Claims. (Cl. 260—247.2)

This application is a division of copending U.S. patent application Ser. No. 237,288, filed Nov. 13, 1962, now Patent No. 3,251,064.

This invention is concerned with β-aminoacylphenyl compounds in which said phenyl ring is further linked to an organic carboxylic acid moiety through oxygen or sulfur and in which the said phenyl ring has $n$ further substituents, $n$ being a whole number from zero to four, as well as the salts, esters and amides thereof. More particularly the invention is concerned with salts of α-(aminomethyl)acylphenyl compounds wherein said organic carboxylic acid moiety is selected from an alkanoic acid or an aromatic carboxylic acid having a six-membered ring such as benzoic acid or a phenyl alkanoic acid.

A more specific embodiment of the invention is concerned with β-aminoacylphenoxy- and β-aminoacylphenylmercapto derivatives of monocarboxylic acids wherein the monocarboxylic acid portion thereof is derived from an aliphatic-, aliphatic-aromatic-, or an aromatic-monocarboxylic acid. These compounds can be illustrated by the structural formula:

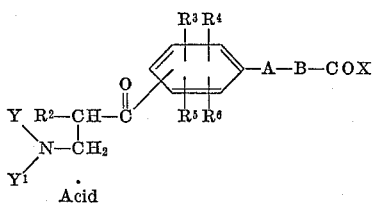

wherein:

$R^2$ is selected from the group consisting of hydrogen, halogen or halogen-like radicals, hydroxyl, lower aliphatic, lower aliphatic-oxy or lower aliphatic-thio, straight or branched chain, saturated or unsaturated, and unsubstituted or substituted, the substituent group(s) being alkyl, amino, particularly a substituted amino, halogen-like, carboxyl or substituted carboxyl, alkyl thio, aryl or substituted aryl, especially a mononuclear aryl, e.g. phenyl, halophenyl, lower alkylphenyl, and lower alkoxyphenyl, aryl thio heterocyclic, especially piperidino, 1-pyrrolidinyl, morpholino and the like, alicyclic, either unsubstituted or substituted, the substituent group being, e.g. a lower alkyl group, aryl or aryl-oxy, especially a phenyl or phenoxy wherein the aryl(phenyl) moiety can be unsubstituted or a substituent can be attached, e.g. a lower alkyl, halogen or lower alkoxy substituent;

$R^3$, $R^4$, $R^5$ and $R^6$ respectively can represent the same or different group selected from hydrogen, halogen or halogen-like, lower aliphatic straight or branched chain, lower aliphatic-oxy or lower aliphatic-thio straight or branched chain, unsubstituted or having a substituent, such as a carboxy substituent, hydroxy, attached at the 2- or 6-position, nitro, amino, especially an acylamino as acetylamino, aryl, especially phenyl, unsubstituted or substituted, e.g. having a halogen or lower alkyl substituent, or wherein $R^3$ and $R^4$ and/or $R^5$ and $R^6$ can additionally be linked together to form, with the ring carbons to which they are attached, a 5- or 6-membered carbocyclic ring;

A represents oxygen or sulfur

B represents a divalent aliphatic, aromatic, preferably a phenyl group, or aliphatic-aromatic group, preferably a phenyl-lower alkyl;

X represents hydroxyl, alkoxyl, unsubstituted or substituted, the substituent(s) being di-aliphatic amino and the like, amino or hydrazino and Y and $Y^1$ respectively can represent the same or different group selected from lower alkyl, e.g. methyl and the like, or Y and $Y^1$ can be joined together either directly or through a hetero atom, to form with the nitrogen atom to which they are attached a heterocyclic ring such as piperidino, and the like.

In the above definitions and in the claims, the term halogen embraces halogen-like groups and represents chlorine, bromine, iodine, fluorine, halomethyl especially trichloromethyl, trifluoromethyl and the like. Also in the above definitions and in the claims, the term amino should be understood to embrace primary, secondary tertiary and quaternary amino groups and the like, as well as the usual pharmaceutically acceptable salts thereof.

The β-acylphenoxy- or the β-acylphenylmercapto-compounds or the salts thereof having the structure illustrated above possess diuretic, natriuretic and chloruretic properties and are therefore useful in the treatment of many ailments resulting from an excessive retention of water and/or electrolytes especially sodium, chloride or sodium and chloride ions, as in the treatment of edema and other conditions associated with electrolyte and fluid retention.

The compounds of this invention are prepared by the reaction illustrated below:

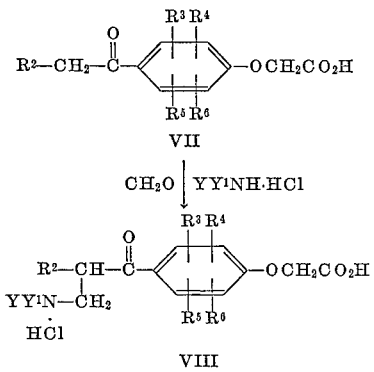

The (β-aminoacyl)phenoxyacetic acid compounds of the invention (VIII) advantageously are prepared by reacting the saturated acyl compound (VII) or its ester with a salt of a secondary amine having the formula $YY^1NH$ (wherein Y and $Y^1$ have the meaning hereinbefore assigned) in the presence of formaldehyde or paraformaldehyde. The reaction can be carried out either with or without a solvent. Thus, the reactants can be admixed and heated to effect the reaction or the reaction can be carried out in an aqueous medium or in the presence of an organic solvent especially methanol, ethanol or other alcohol. Various salts can be formed by preforming the salts of the amine reactant with the selected acid. Preferred salts are formed with hydrohalides especially the hydrochlorides and hydrobromides.

Compounds of this invention wherein X represents an amide, hydrazide or an alkoxy group can be prepared by known methods by initially converting the product VIII to its acid chloride, and then reacting the acid chloride with the desired amine, hydrazine or alcohol to form the amide, hydrazide or ester derivative of product VIII.

While, for the sake of simplicity, the above reaction scheme illustrates the preparation of p-(β-aminoacyl)phenoxyacetic acids, it is to be understood that the reaction scheme and the above described reaction can be used to prepare the other position isomers and that it also illustrates a method for preparing other β-aminoacylphenyl compounds wherein said phenyl ring is linked to an organic carboxylic acid moiety through oxygen or sulfur, as well as the salts, esters and amides thereof.

PREPARATION OF SATURATED-ACYL-PHENOXYACETIC ACIDS (VII)

The intermediate saturated-acylphenoxyacetic acid (VII) generally can be made by one of two methods from the known phenols (I), as illustrated by the following reaction scheme.

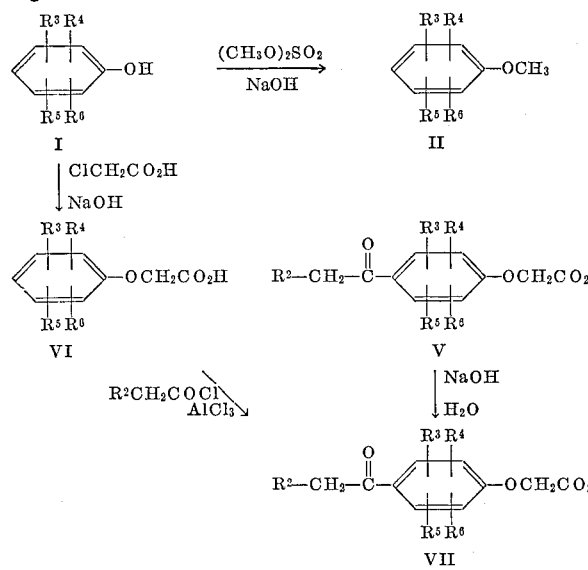

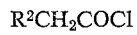

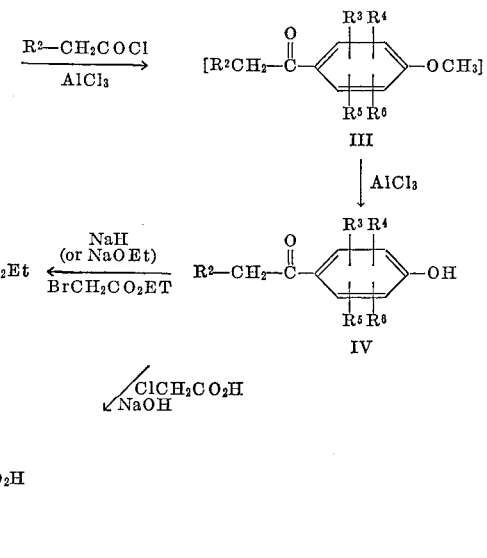

One method illustrated above involves heating the phenol (I) with an excess of chloroacetic acid in the presence of at least two moles of an alkali metal hydroxide to form the phenoxyacetic acid (VI).

The phenoxyacetic acids (VI) then are converted to the saturated acylphenoxyacetic acids (VII) by the Friedel-Craft reaction involving an acyl halide, $$R^2CH_2COCl$$

and compound VI in the presence of aluminum chloride. The reaction can be carried out either with or without a solvent, such as carbon disulfide. Product VII can be converted to an ester by reaction with an alcohol in the usual manner. As mentioned above, the esters can be converted to the (β-aminoacyl)phenoxyaliphatic acid ester compound.

The above procedure which describes the preparation of acylphenoxyaliphatic acids generally can be adapted to prepare the acylphenylmercaptoaliphatic acids as well.

Although this method has limited applicability, it is the one of choice, where applicable, since it is the most direct route.

A second method although longer, has a broader utility. In this process, the phenol (I) is converted to the corresponding anisole (II) (or phenetole) by known methods, as by reaction with dimethyl sulfate or diethyl sulfate in the presence of a base such as sodium or potassium hydroxide. The anisole (II) (or phenetole) then is reacted with the acyl halide, $R^2$—$CH_2COCl$, in the presence of anhydrous aluminum chloride and a solvent as ligroin or carbon disulfide. The acylanisole (III) (or -phenetole) then is converted to the corresponding acylphenol (IV) by subsequent treatment with additional aluminum chloride in a solvent such as heptane.

The acylphenol (IV) can then be converted to the acylphenoxyacetic acid (VII) by reaction with a haloaliphatic acid (preferably chloroacetic acid) in the presence of sodium or potassium hydroxide.

Alternatively, compound VII can be prepared from compound IV by a two step process whereby the acylphenol (IV) is treated with a suspension of sodium hydride in ethylene glycol dimethyl ether (glyme) (or sodium ethoxide in ethanol) followed by reaction with a haloaliphatic acid ester, as ethyl bromoacetate, to form an acylphenoxyacetic acid ester (V). Hydrolysis of the ester V by aqueous or alcoholic base produces compound VII.

While, for simplicity sake, the reaction scheme illustrating the preparation of the acylphenoxyacetic acids (VII) shows the preparation of para-acylphenoxyacetic acid compounds, the methods illustrated and described above can be employed to make the other position isomers also. It sometimes is more convenient, however, to prepare the ortho isomers by the Fries Rearrangement illustrated below. The R's in the following structures are attached to the phenyl nucleus so as to leave one of the ortho positions unsubstituted.

PREPARATION OF o-ACYLPHENOXYACETIC ACIDS (VIIa)

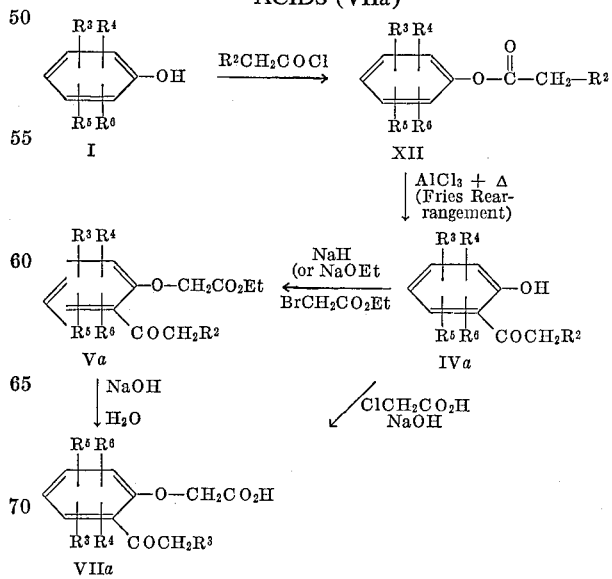

According to the Fries Rearrangement procedure illustrated above, the phenol (I) initially is esterified by reaction with the acyl halide, $R^2$—$CH_2COCl$, to form the corresponding phenolic ester (XII) which is rearranged to the ortho-acylphenol (IVa), upon heating with aluminum chloride. The conversion of the ortho-acylphenol (IVa) to the desired ortho-acylphenoxyacetic acid (VIIa) by either (a) treatment with chloroacetic acid in presence of base or (b) reaction of IVa with sodium hydride or sodium alkoxide followed by reaction with a haloacetic acid ester to form Va which is hydrolyzed to VIIa follows substantially the same procedures described above for converting IV to VII or for converting IV to V to VII. While the Fries Rearrangement is especially useful for preparing the ortho-isomers, it can be used to prepare para-isomers also.

While the above discussion outlines general methods suitable for the preparation of the novel compounds of this invention, it is to be understood that the methods described above as well as those described in the following examples are illustrative of those methods which can be employed and are not to be construed as limiting the invention to the particular methods or the particular compounds specifically described.

*Example 1.—3-chloro-4-propionylphenoxyacetic acid*

Powdered aluminum chloride (216 g., 1.625 mole) and carbon disulfide (400 ml.) are placed in a 1-liter, 4-necked flask equipped with a stirrer, dropping funnel, reflux condenser and internal thermometer. 3-chlorophenoxyacetic acid (93.29 g., 0.5 mole) is added in portions with stirring and then propionyl chloride (57.8 g., 0.625 mole) is added dropwise with stirring over a period of 0.5 hour at a temperature of about 22–26° C. After stirring 1 hour at room temperature, the reaction flask is placed in a water bath and the temperature maintained at 50° C. for 3 hours. The carbon disulfide then is decanted and the aluminum complex remaining is added to a mixture of 1 kg. of ice and 125 ml. of concentrated hydrochloric acid. The solid that separates is dried in air and then dried further by azetropic distillation with benzene and then crystallized from benzene to give 77.5 g. (32%) of 3-chloro-4-propionylphenoxyacetic acid, M.P. 107.5–109° C.

*Analysis.*—Calculated for $C_{11}H_{11}ClO_4$: C, 54.44; H, 4.57; Cl, 14.61. Found: C, 54.88; H, 4.46; Cl, 14.36.

*Example 2.—3-methyl-4-(4-chlorobutyryl) phenoxyacetic acid*

The above product is obtained following substantially the same method described in Example 1, using the following substances:

3-methylphenoxyacetic acid _____ 33.2 g., 0.2 mole.
4-chlorobutyryl chloride _____ 28.2 g., 0.2 mole.
Aluminum chloride, powdered ____ 33.2 g., 0.25 mole.
Carbon disulfide _____ 300 ml.

The product obtained is extracted with ether and the ether extract washed with water, dried over sodium sulfate, filtered and evaporated to dryness on the steam bath. The residue is recrystallized from benzene to give 3-methyl - 4 - (4 - chlorobutyryl)phenoxyacetic acid, M.P. 86.5–88° C.

*Analysis.*—Calculated for $C_{13}H_{15}ClO_4$: C, 57.67; H, 5.59; Cl, 13.10. Found: C, 57.52; H, 5.76; Cl, 13.09.

*Example 3.—3-methyl-4-(4-phenylmercaptobutyryl) phenoxyacetic acid*

A solution of 2.2 ml. of thiophenol in 50 ml. of ethanol containing 1.12 g. of potassium hydroxide and 2.6 g. of 4-(4-chlorobutyryl)-3-methylphenoxyacetic acid is heated on a steam bath for 30 minutes, cooled and poured into 60 ml. of water. The solution is acidified with hydrochloric acid and the resulting oil is extracted with ether. The ethereal extract is washed with water, dried over sodium sulfate, filtered and evaporated to dryness. The residue is recrystallized from carbon tetrachloride to give 3-methyl-4 - (4 - phenylmercaptobutyryl)-phenoxyacetic acid, M.P. 60–62° C.

*Analysis.*—Calculated for $C_{13}H_{15}ClO_4$: C, 57.67; H, 5.84. Found: C, 66.18; H, 5.64.

*Example 4.—3-methyl-4-p-tolylmercaptoacetyl-phenoxyacetic acid*

To a cooled solution of 5.0 g. (0.02 m.) of p-methyl-thiophenol in 100 ml. of ethanol and 8 ml. of 20% aqueous sodium hydroxide, 4.8 g. (0.02 m.) of 3-methyl-4-chloroacetylphenoxyacetic acid is added. The mixture is heated under reflux for 30 minutes, cooled, poured into 150 ml. of water, acidified with hydrochloric acid and extracted with benzene. The benzene extract is washed with water, dried over sodium sulfate, filtered and concentrated. Crystallization of the product from a mixture of benzene and petroleum ether gives 3-methyl-4-p-tolyl-mercaptoacetylphenoxyacetic acid, M.P. 117–119° C.

*Analysis.*—Calculated for $C_{18}H_{18}O_4S$: C, 65.45; H, 5.49; S, 9.69. Found: C, 65.83; H, 5.49; S, 9.65.

*Example 5.—Ethyl 3-methyl-4-[4-(4-morpholinyl) butyryl]phenoxyacetate hydrochloride*

A solution of 3-methyl-4-(4-chlorobutyryl)phenoxyacetic acid (5.4 g., 0.02 mole) prepared as described in Example 2 and morpholine (8.7 g., 0.1 mole) in 30 ml. of benzene and 50 mg. of potassium iodide, is heated under reflux for 24 hours, filtered and concentrated to dryness in vacuo. The residue is heated under reflux for 2 hours with 50 ml. of 30% alcoholic hydrogen chloride and the solution concentrated to dryness in vacuo. Aqueous sodium bicarbonate is added and the mixture is extracted with ether. The ethereal extract is washed with water, dried over sodium sulfate, filtered and evaporated to dryness on a steam bath. The residue is crystallized from alcoholic hydrogen chloride to give ethyl 3-methyl-4 - [4-(4-morpholinyl) butyryl]phenoxyacetate hydrochloride, M.P. 131.5–134.5° C.

*Analysis.*—Calculated for $C_{19}H_{22}ClNO_5$: C, 59.14; H, 7.31; N, 3.63. Found: C, 58.92; H, 7.24; N, 3.59.

*Example 6.—3-methyl-4-chloroacetylphenoxyacetic acid*

The above product is prepared following substantially the same process described in Example 1 using the following substances:

3-methylphenoxyacetic acid _____ 33.3 g., 0.2 mole.
Chloroacetyl chloride _____ 22.6 g., 0.2 mole.
Aluminum chloride, powdered _____ 80 g., 0.6 mole.
Carbon disulfide _____ 300 ml.

The solid product that forms is collected on the filter, washed with water, air dried and recrystallized from benzene to give 3-methyl-4-chloroacetylphenoxyacetic acid, M.P. 118–120° C.

*Analysis.*—Calculated for $C_{11}H_{11}ClO_4$: C, 54.44; H, 4.57; Cl, 14.61. Found: C, 54.68; H, 4.66; Cl, 14.45.

*Example 7.—3-methyl-4-phenoxyacetylphenoxyacetic acid*

A solution of 3-methyl-4-chloroacetylphenoxyacetic acid, from Example 6, (2.4 g., 0.01 mole) and phenol (1.88 g.) in 50 ml. of water and 4 ml. of 20% aqueous sodium hydroxide is heated on the steam bath for 1 hour, cooled and acidified. The product obtained is crystallized from a mixture of benzene and petroleum ether to give 3-methyl-4-phenoxyacetylphenoxyacetic acid, M.P. 145–148° C.

Analysis.—Calculated for $C_{17}H_{16}O_5$: C, 68.08; H, 5.38. Found: C, 68.31; H, 5.57.

*Example 8.—3-methyl-4-benzylmercaptoacetyl-phenoxyacetic acid*

3-methyl-4-chloroacetylphenoxyacetic acid (2.4 g.), prepared as described in Example 6, is added to a solution of benzylmercaptan (2.5 ml.) in 50 ml. of ethanol and 4 ml. of 20% aqueous sodium hydroxide and heated under reflux for 15 minutes. The solution is cooled, poured into 100 ml. of water, acidified with hydrochloric acid and extracted with benzene. The benzene extract is washed with water, dried over sodium sulfate, filtered and concentrated. Recrystallization of the product thus obtained from a mixture of benzene and petroleum ether gives 3-methyl-4 - benzylmercaptoacetylphenoxyacetic acid, M.P. 74–75° C.

Analysis.—Calculated for $C_{18}H_{18}O_4S$: S, 9.71. Found: S, 9.00.

Examples 9–14 which follow describe the preparation of novel β-aminoacylphenoxy derivatives of monocarboxylic acid compounds (VIII) of this invention. It should be understood that the products described below are representative of the novel products of this invention and that the invention is not limited to those compounds specifically described. The invention also contemplates the inclusion of other related compounds which fall within the scope of the disclosure and the appended claims.

*Example 9.—3-chloro-4-[2-(dimethylaminomethyl)butyryl]phenoxyacetic acid hydrochloride*

In a 100 ml. round flask equipped with an outlet tube suitable for application of intermittent suction, an intimate mixture of 3-chloro-4-butyrylphenoxyacetic
  acid _____ 5.12 g., 0.02 mole.
Paraformaldehyde _____ 0.7 g., 0.022 mole.
Dimethylamine hydrochloride _____ 1.78 g., 0.02 mole.
Acetic acid _____ 4 drops.

is heated on the steam bath for about 1.5 hours during which time suction is applied for about one-minute intervals five or six times. Upon cooling, the product is isolated by triturating the reaction mixture with acetone. The white solid that forms is crystallized from acetonitrile and then from isopropyl alcohol to give 3-chloro-4-[2 - (dimethylaminomethyl)butyryl]phenoxyacetic acid hydrochloride, M.P. 127–129° C.

Analysis. — Calculated for $C_{15}H_{20}ClNO_4 \cdot HCl$: C, 51.44; H, 6.04; Cl, 20.25. Found: C, 51.32; H, 5.90; Cl, 20.19.

The novel compounds of this invention identified in the following tables are made by substantially the same method described above, employing the same molar ratio of reactants used in Example 9. Several tables are used to describe the novel products of this invention in order to simplify presentation of various types of products which illustrate the scope of this invention. In each instance, the table identifies the acylphenoxyalkanoic acid (VII) used as well as the example where its preparation is described. The table also identifies the amine reactant as well as the solvent used in the primary trituration of the reaction product. Crystallization solvents employed in isolating and purifying the end product also are identified in the tables and melting points and analysis are given for those products which are purified. The radicals $R^2$, $R^3$, $R^4$, $R^5$, $R^6$, B, Y and $Y^1$ in the starting materials are fied in the tables. It should be noted that the radicals $R^2$, $R^3$, $R^4$, $R^5$, $R^6$, B, Y and $Y^1$ in the starting materials are retained unchanged in the end products.

TABLE I $$R^2CH_2CO\underset{R^5}{\overset{R^4 \quad R^3}{\text{—}\bigcirc\text{—}}}O\text{—}B\text{—}CO_2H + (CH_2)_nNH \cdot HCl \xrightarrow[\text{Acetic Acid}]{\text{Paraformaldehyde}} R_2CH\text{—}CO\underset{R^5}{\overset{R^4 \quad R^3}{\text{—}\bigcirc\text{—}}}O\text{—}B\text{—}CO_2H$$
$$\overset{|}{\underset{HCl \cdot N(CH_3)_2}{CH_2}}$$

VII                                                      VIII

| Ex. No. | Prepn. VII Ex. No. | $R^3$ | $R^4$ | $R^5$ | $R^6$ | B | $R^2$ | Yield, percent | M.P. [B.P.], ° C. | End Product Empirical | End Product Analysis C | H | N | Cl |
|---|---|---|---|---|---|---|---|---|---|---|---|---|---|---|
| 10 | 7 | H | CH₃– | H | H | –CH₂– | –O–C₆H₅ | | | | Not purified. | | | |
| 11 | 8 | H | CH₃– | H | H | –CH₂– | –CH₂–S–C₆H₅ | | | | Not purified. | | | |
| 12 | 3 | H | CH₃– | H | H | –CH₂– | –S–(CH₂)₂–C₆H₅ | | a b 161–162 | $C_{21}H_{27}NO_4S \cdot HCl$ | Calc. 60.40 / Found 61.02 | 6.44 / 6.98 | 3.19 / 2.84 | | a Triturated with ether.   b Crystallized from mixture of ethanol and ether.

TABLE II

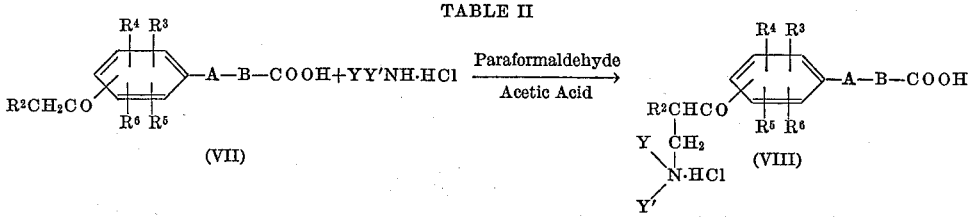

| Ex. No. | Prepn. VII Ex. No. | $R^3$ | $R^4$ | $R^5$ | $R^6$ | A | B | Position of Acyl Grp. | $R^2$ | Y\N/Y' | End Product |
|---|---|---|---|---|---|---|---|---|---|---|---|
| 13 | 5 | 2-H | 3-CH₃ | 5-H | 6-H | O | —CH₂— | 4 | O⌒H N—(CH₂)₂— | CH₃\N/CH₃ | Not purified. |
| 14 | 4 | 2-H | 3-CH₃— | 5-H | 6-H | O | —CH₂— | 4 | CN₃—⌬—S | CH₃\N/CH₃ | |

I claim:
1. A member selected from the group consisting of a compound having the formula:

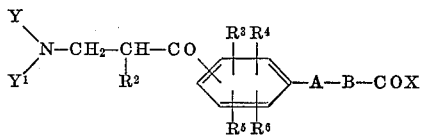

and the pharmaceutically acceptable acid addition salts thereof, wherein A is a member selected from the group consisting of oxygen and sulfur; B is a member selected from the group consisting of lower alkylene, mononuclear carbocyclic arylene and mononuclear carbocyclic alkarylene; $R^2$ is a member selected from the group consisting of mononuclear carbocyclic aryloxy, mononuclear carbocyclic arylthio, mononuclear carbocyclic aralkylthio and heterocyclic lower alkyl wherein the heterocyclic radical is a member selected from the group consisting of 1-pyrrolidinyl, piperidino and morpholino; $R^3$, $R^4$, $R^5$ and $R^6$ are similar and dissimilar members selected from the group consisting of hydrogen, halogen, lower alkyl, lower alkoxy, nitro, amino and, taken together with the ring carbon atoms to which they are attached, the $R^3$ and $R^4$ radicals are joined to form an alkylene chain having from three to four carbon atoms between their points of attachment to the benzene ring; X is a member selected from the group consisting of hydroxy, lower alkoxy, amino and hydrazino; and the carboxylic acid group is in a position which is meta and para with respect to the aminoacyl group; and Y and $Y^1$ are similar and dissimilar lower alkyl radicals or, together with the nitrogen atom to which they are attached, an heterocyclic moiety selected from the group consisting of pyrrolidino, piperidino, morpholino and piperazino.

2. A pharmaceutically acceptable acid addition salt of a compound as defined in claim 1 having the following structural formula:

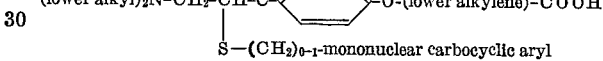

wherein $Y^1$ is lower alkyl.

3. A pharmaceutically acceptable acid addition salt of a compound as defined in claim 1 having the following structural formula:

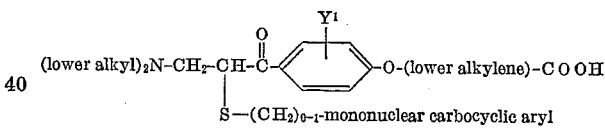

wherein Y is halogen

4. A pharmaceutically acceptable acid addition salt of a compound as defined in claim 1 having the following structural formula:

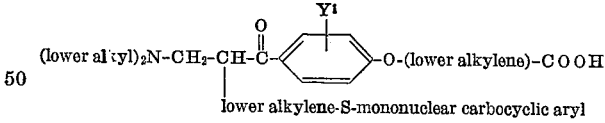

wherein $Y^1$ is lower alkyl.

5. A pharmaceutically acceptable acid addition salt of a compound as defined in claim 1 having the following structural formula:

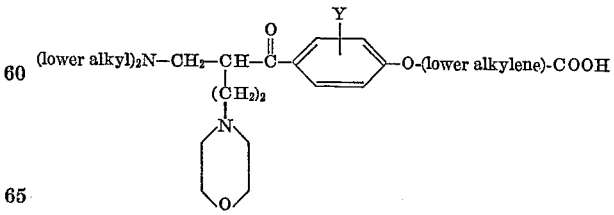

wherein $Y^1$ is lower alkyl.

6. A pharmaceutically acceptable acid addition salt of a compound as defined in claim 1 having the following structural formula:

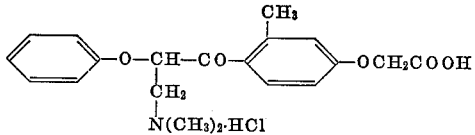

wherein Y is lower alkyl.

7. A compound according to claim 2 having the following structural formula:

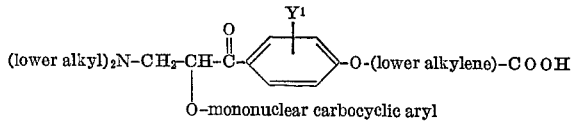

8. A compound according to claim 4 having the following structural formula:

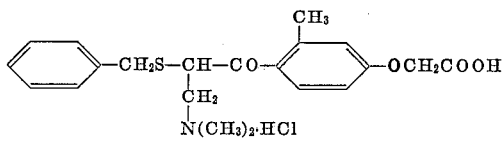

9. A compound according to claim 4 having the following structural formula:

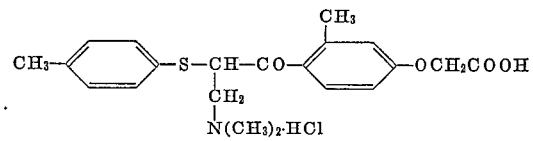

10. A compound according to claim 5 having the following structural formula:

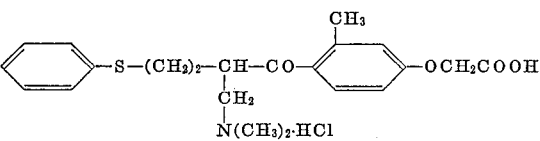

11. A compound according to claim 6 having the following structural formula:

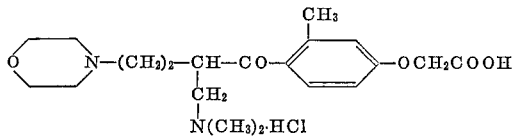

No references cited.

ALEX MAZEL, *Primary Examiner.*

J. TOVAR, *Assistant Examiner.*